United States Patent
Muller et al.

(10) Patent No.: US 9,056,552 B2
(45) Date of Patent: Jun. 16, 2015

(54) METHOD AND SYSTEM FOR CHARGING A PLUG-IN ELECTRIC VEHICLE

(71) Applicant: GM GLOBAL TECHNOLOGY OPERATIONS LLC, Detroit, MI (US)

(72) Inventors: Brett T. Muller, Milford, MI (US);
Nicholas J. Hainer, Howell, MI (US);
Adam R. Sepanak, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 437 days.

(21) Appl. No.: 13/665,187

(22) Filed: Oct. 31, 2012

(65) Prior Publication Data

US 2014/0117946 A1    May 1, 2014

(51) Int. Cl.
| H02J 7/04 | (2006.01) |
| H02J 7/14 | (2006.01) |
| B60L 11/18 | (2006.01) |
| H01M 10/44 | (2006.01) |
| H02J 7/00 | (2006.01) |
| H02J 13/00 | (2006.01) |

(52) U.S. Cl.
CPC .............. *B60L 11/18* (2013.01); *B60L 11/1809* (2013.01); *B60L 11/1801* (2013.01); *H01M 10/44* (2013.01); *Y02T 10/7011* (2013.01); *B60L 11/184* (2013.01); *H02J 7/0042* (2013.01); *H02J 13/0006* (2013.01); *Y02T 10/7005* (2013.01); *Y02T 90/163* (2013.01); *Y02T 90/169* (2013.01); *Y02T 90/121* (2013.01); *Y02T 90/14* (2013.01); *Y02T 90/128* (2013.01); *Y04S 30/14* (2013.01)

(58) Field of Classification Search
CPC ... B60L 11/18; B60L 11/184; B60L 11/1801; B60L 11/1809; H01M 10/44; H02J 7/0042; H02J 7/0068; Y02T 90/14; Y02T 10/7005; Y02T 90/128; Y02T 10/7088; Y02T 90/163; Y02E 60/12
USPC .................................................. 320/162, 104
See application file for complete search history.

(56) References Cited

U.S. PATENT DOCUMENTS

| 4,849,682 | A | * | 7/1989 | Bauer et al. .................... 320/106 |
| 6,118,255 | A | * | 9/2000 | Nagai et al. .................... 320/152 |
| 2009/0072788 | A1 | * | 3/2009 | Delaille et al. ................ 320/124 |

(Continued)

FOREIGN PATENT DOCUMENTS

DE         102010051016 A1    5/2012

OTHER PUBLICATIONS

German Search Report dated Jan. 14, 2015, 4 pages.
Society of Automotive Engineers (SAE), "SAE Electric Vehicle Conductive Charge Coupler", Oct. 1996, Publication No. J1772.

(Continued)

*Primary Examiner* — M'Baye Diao
(74) *Attorney, Agent, or Firm* — Reising Ethington P.C.; Lionel D. Anderson

(57) ABSTRACT

A system and method for charging a battery in a plug-in electric vehicle. In an exemplary embodiment, the method determines if a delayed battery charging feature is active and if the battery is severely depleted. If both conditions are satisfied, the method enables a priority charging feature that temporarily overrides the delayed charging feature and begins charging the battery according to a priority charging process until it reaches a level where it is no longer severely depleted. At this point, the method may terminate the priority charging process and initiate the delayed charging process, which is designed to take advantage of off-peak electricity rates, anticipated times of vehicle use, etc.

19 Claims, 3 Drawing Sheets

(56) References Cited

U.S. PATENT DOCUMENTS

| | | | |
|---|---|---|---|
| 2010/0156355 A1* | 6/2010 | Bauerle et al. | 320/145 |
| 2011/0288712 A1* | 11/2011 | Wang et al. | 701/22 |
| 2011/0320832 A1* | 12/2011 | Boss et al. | 713/310 |
| 2012/0245750 A1* | 9/2012 | Paul et al. | 700/291 |
| 2013/0234664 A1* | 9/2013 | Marus et al. | 320/109 |

OTHER PUBLICATIONS

Society of Automotive Engineers (SAE), "(R) SAE Electric Vehicle Inductively Coupled Charging", (R) Nov. 1999, Publication No. J1773.

* cited by examiner

METHOD AND SYSTEM FOR CHARGING A PLUG-IN ELECTRIC VEHICLE

FIELD

The present invention generally relates to plug-in electric vehicles, and more particularly, to a method and system for charging plug-in electric vehicles.

BACKGROUND

It is known for charging systems in various types of plug-in electric vehicles to include a delayed charging feature. When active, a delayed charging feature, as the name suggests, causes charging of the vehicle battery to be delayed for a period of time rather than charging the battery immediately upon the vehicle being "plugged in."

Delayed charging features can provide a number of benefits. These benefits may include, for example, lessening the demand on the power source during periods of time when such demand is typically at its peak, allowing the battery to be charged during periods of time when electricity costs are reduced (i.e., off-peak electricity rates), and charging the battery as close as possible to a known departure time so as to reduce the loss of charge in the battery and to enhance its calendar life by minimizing the time at which it is at a maximum state-of-charge (SOC). Delayed charging features are not without their drawbacks, however.

For example, when a plug-in electric vehicle with a severely depleted battery is connected to a power source, implementing delayed charging features effectively renders the vehicle useless until the battery is sufficiently re-charged. As a result, if an unplanned event occurs that requires use of the vehicle (e.g., a trip to the store) during the time in which charging is delayed, that vehicle will be unavailable.

SUMMARY

According to one embodiment, there is provided a method of charging a battery in a plug-in electric vehicle. The method may comprise the steps of: (a) determining if a delayed charging feature is active; (b) determining if a pre-charge battery parameter satisfies a priority charging threshold; and (c) when the delayed charging feature is active and the pre-charge battery parameter satisfies the priority charging threshold, then using a control module to enable a priority charging feature that temporarily overrides the delayed charging feature and charges the battery according to a priority charging process.

According to another embodiment, there is provided a method of charging a battery in a plug-in electric vehicle. The method may comprise the steps of: (a) determining if the battery is connected to an external power source; (b) determining if the battery is severely depleted; (c) when the battery is connected to the external power source and the battery is severely depleted, then using a control module to bypass a delayed charging process and to charge the battery according to a priority charging process; and (d) when the battery is still connected to the external power source and the battery is no longer severely depleted, then using the control module to stop the priority charging process and to begin the delayed charging process.

According to yet another embodiment, there is provided a system for charging a battery in a plug-in electric vehicle, comprising: one or more battery sensor(s) coupled to the battery, a control module coupled to the battery sensor(s), and a battery charger coupled to the control module. The control module is configured to: determine if a delayed charging feature is active; determine if battery parameters satisfy a priority charging threshold; and provide command signals when the delayed charging feature is active and the battery parameters satisfy the priority charging threshold. The command signals cause the battery charger to charge the battery according to a priority charging process.

DRAWINGS

Preferred exemplary embodiments will hereinafter be described in conjunction with the appended drawings, wherein like designations denote like elements, and wherein.

DESCRIPTION

The method and system described herein may be used to charge any type of plug-in electric vehicle having a battery, such as a plug-in hybrid electric vehicle (PHEV), an extended-range electric vehicle (EREV), or a battery electrical vehicle (BEV), to cite a few possibilities. In general terms, when a plug-in electric vehicle is connected to an external power source, the method and system determine whether a priority charging feature should be enabled. If so, the priority charging feature preempts or temporarily overrides operation of a delayed charging feature and charges the battery of the plug-in electric vehicle without delay. In instances where the battery is severely depleted, the priority charging feature first charges the battery to a minimum level and then passes control to the delayed charging feature so that it can take advantage of off-peak electricity rates, preferred charging times, etc. "Severely depleted," as used herein, refers to a condition or state where the battery charge, voltage, current and/or some other parameter is so low that the plug-in electric vehicle cannot even be driven for short distances if needed, such as to a store or hospital.

Figure 1:
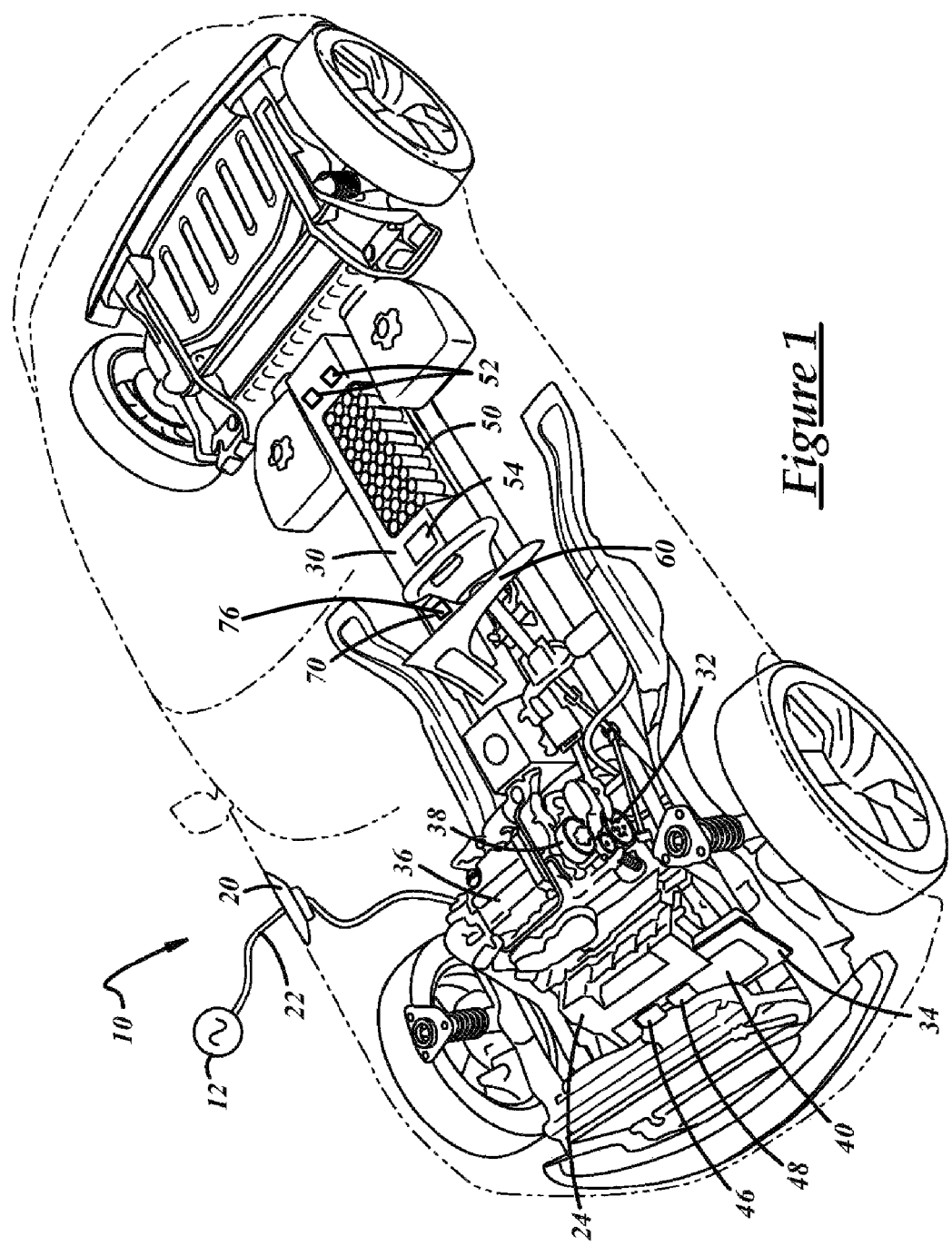
FIG. 1 is a schematic view of an exemplary embodiment of a plug-in electric vehicle that may utilize the charging system and method disclosed herein.

With reference to FIG. 1, there are shown some of the components of an exemplary plug-in electric vehicle 10 with which the method and system described herein may be used. Although the following description is provided in the context of the particular plug-in electric vehicle 10 illustrated in FIG. 1, it will be appreciated that this vehicle is merely exemplary and that other plug-in electric vehicles may certainly be used instead. According to an exemplary embodiment, plug-in electric vehicle 10 interacts with an external power source 12 and may include, among other components, a power connection 20, a power coupler 22, a battery charger 24, a battery 30, an electric motor 32, an inverter/converter 34, a control module 40, a user interface 60, and a communications module 70.

External power source 12 provides plug-in electric vehicle 10 with electrical power over power coupler 22, and may be one of a number of different power supply types known in the art. For example, external power source 12 can be a public utility that provides electrical power via standard power outlets (e.g., 110 VAC or 220 VAC outlets), or it can be a portable generator such as the type that runs on natural gas, propane, gasoline, diesel, or the like. In one embodiment, external power source 12 is a renewable power source, such as a remote charging station powered by energy from solar panels, wind turbines, hydroelectric means, biomass, etc. External power source 12 is not limited to any particular type or embodiment, so long as it can provide electrical power to plug-in electric vehicle 10 over power coupler 22.

Power connection 20 is an electrical inlet on the plug-in electric vehicle into which power coupler 22 can be plugged or inserted. This enables a vehicle owner or user to easily connect and disconnect plug-in electric vehicle 10 to and from a common AC wall outlet, for example, such as those commonly found in most garages and charging stations. Power connection 20 is not limited to any particular design, and may be any type of inlet, connection, socket, plug, port, receptacle, etc., including those that are based on conductive, inductive, or other types of electrical connections. Some of these connection types are covered by one or more international standards (e.g., IEC 62196 type 1-2 and mode 1-4, IEC 60309, SAE J1772, etc.). In an exemplary embodiment, power connection 20 is an electrical inlet located on the exterior of plug-in electric vehicle 10 so that it can be easily accessed (e.g., under a hinged door or flap), and includes one or more connections to battery charger 24 for conveying electrical power, and one or more connections to control module 40 for communication. Other arrangements and connections are certainly possible.

Power coupler 22 can be used to connect external power source 12 to plug-in electric vehicle 10. Power couplers are sometimes referred to as electric vehicle supply equipment (EVSE) cordsets. Power coupler 22, in one embodiment, may be a specialized cordset specifically designed for use with plug-in electric vehicles (such as those described in specifications SAE J1772 and J1773), which includes a first end, a cable or cord, a control unit, and a second end. The first end of power coupler 22 is a three-prong connection that plugs into a standard AC wall outlet and its second end is a specifically designed connection that plugs into power connection 20 on the vehicle. The cable conducts or transmits electrical power from external power source 12 to plug-in electric vehicle 10, but may also convey one or more communication signals between a control unit of power coupler 22 and devices located on the vehicle, like control module 40. The control unit of power coupler 22 may include any number of electronic components including, but certainly not limited to, sensors, transceivers, processing devices, memory devices, contactors, switches, ground fault circuit interrupter (GFCI) components, as well as any other suitable component. In an exemplary embodiment, the control unit of power coupler 22 is powered by an external power source, monitors various conditions surrounding the power coupler (e.g., the presence of electrical power, the voltage and/or current of the electrical power, the temperature of the power coupler, etc.), and communicates with control module 40 regarding such conditions. Skilled artisans will appreciate that the method described herein is not limited to any particular power coupler or cordset, as any number of different power couplers could be used.

Battery charger 24 may receive electrical power from a variety of sources, including external and/or internal power sources. In the case of an external power source, battery charger 24 may receive electrical power through power coupler 22 which connects external power source 12 to battery charger 24, as already explained. In the case of an internal power source, battery charger 24 may receive electrical power from regenerative braking, a motor-driven generator, or some other internal source via connections within the vehicle. In certain embodiments, battery charger 24 may be configured to perform one or more steps of the charging control methodology described below. Skilled artisans will appreciate that battery charger 24 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 30 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 50, one or more battery sensors 52, and a battery control unit 54. Battery pack 50 is a high-voltage battery pack and may include a collection of identical or individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. The battery pack 50 may provide approximately 40-600V, depending on its particular design and application. For example, a heavy truck using a two-mode hybrid system may require a high voltage battery pack capable of providing about 350V, where a lighter vehicle may only need about 200V. In another embodiment, battery 30 may be part of a belt-alternator-starter (BAS) or BAS-plus type system and thus only require a battery pack that provides about 40-110V. In any case, battery pack 50 should be designed to withstand repeated charge and discharge cycles and to receive electrical energy from external power source 12. Skilled artisans will appreciate that the system and method shown and described herein are not limited to any one particular type of battery or battery arrangement, as a number of different battery types could be employed.

Battery sensors 52 may include any combination of hardware and/or software components capable of monitoring battery conditions or parameters (e.g., electrical parameters of the battery pack 50) such as, for example, battery temperature, battery voltage, battery current, battery state-of-charge (SOC), battery state-of-health (SOH), and other conditions or parameters that may relate to the charge level or capacity of the battery. These sensors may be integrated within unit 30 (e.g., an intelligent or smart battery), they may be external sensors located outside of the battery unit, or they may be provided according to some other known arrangement. Battery sensors 52 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 52 may be provided to battery control unit 54, battery charger 24, control module 40, or some other appropriate device. Accordingly, battery sensors 52 may be electrically connected (e.g., by one or more wires or cables, wirelessly, etc.) to one or more of the aforementioned components.

Battery control unit 54 may include any variety of electronic processing devices, memory devices, input/output (I/O) devices, and other known components, and may perform various control and/or communication related functions. For example, battery control unit 54 may receive sensor signals from the various battery sensors 52, package the sensor signals into an appropriate sensor message, and send the sensor message to control module 40 over a communication bus or the like. It is possible for battery control unit 54 to gather battery sensor readings and store them in local memory so that a comprehensive sensor message can be provided to control module 40 at a later time, or the sensor readings can be forwarded to module 40 or some other destination as soon as they arrive at battery control unit 54, to cite a few possibilities. Instead of sending the battery sensor readings to control module 40 for subsequent processing, it is possible for battery control unit 54 to process or analyze the sensor readings itself. In another capacity, battery control unit 54 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc. Additionally, in certain embodiments, battery control unit 54 may be configured to perform one or more steps of the charging control methodology described below.

Electric motor 32 may use electrical energy stored in battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Plug-in electric vehicle 10 is not limited to any one particular type of electric motor, as many different motor types, sizes, technologies, etc. may be used. In one example, electric motor 32 includes an AC motor (e.g., a three-phase AC induction motor, a multi-phase AC induction motor, etc.), as well as a generator that can be used during regenerative braking. Electric motor 32 may be provided according to any number of different embodiments (e.g., AC or DC motors, brushed or brushless motors, permanent magnet motors, etc.), it may be connected in any number of different configurations, and it may include any number of different components, like cooling features, sensors, control units and/or any other suitable components known in the art.

Inverter/converter 34 may act as an intermediary between battery 30 and electric motor 32, as these two devices are often times designed to function according to different operational parameters. For example, during vehicle propulsion inverter/converter 34 may step-up the voltage from battery 30 and convert the current from DC to AC in order to drive electric motor 32, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof In the exemplary embodiment shown, inverter and converter units are integrated into a single bi-directional device; however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

In certain embodiments, the plug-in electric vehicle 10 may further comprise an engine 36 and a generator 38. Engine 36 may drive generator 38 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 36 is a small fuel-efficient engine (e.g., a small displacement, turbo-charged four-cylinder engine) that uses its mechanical output to turn generator 38. Skilled artisans will appreciate that engine 36 may be provided according to any number of different embodiments, may be connected in any number of different configurations (e.g., engine 36 could be part of a parallel hybrid system where the engine is also mechanically coupled to the vehicle wheels instead of exclusively being used to generate electricity), and may include any number of different components, like sensors, control units and/or any other suitable components known in the art.

Generator 38 is mechanically coupled to engine 36 so that the mechanical output of the engine causes the generator to create electrical power that may be provided to battery 30, electric motor 32, or both. It is worth noting that generator 38 may be provided according to any number of different embodiments (e.g., the generator of motor 32 and generator 38 may be combined into a single unit), may be connected in any number of different configurations, and may include any number of different components, like sensors, control units and/or any other suitable components known in the art. Generator 38 is not limited to any specific generator type or embodiment.

Control module 40 may be used to control, govern or otherwise manage certain operations or functions of plug-in electric vehicle 10, such as, for example, the charging of the battery 30 (e.g., the battery pack 50 thereof). According to one exemplary embodiment, the control module 40 includes a processing device 46 and a memory device 48. Processing device 46 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 48 may include any type of suitable electronic memory means and may store a variety of data and information. This includes, for example: sensed battery conditions; look-up tables and other data structures; software, firmware, programs, algorithms, scripts, and other electronic instructions; component characteristics and background information; various battery parameter thresholds; etc. The present method—as well as any other electronic instructions and/or information needed for such tasks—may also be stored or otherwise maintained in memory device 48. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible. Depending on the particular embodiment, control module 40 may be a stand-alone electronic module (e.g., a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities.

While the description above provides that the control module 40 is configured to perform one or more steps of the methodology described below, the present disclosure is not meant to be so limited. Rather, in other exemplary embodiments that remain within the spirit and scope of the present disclosure, various components of the plug-in electric vehicle 10 (e.g., battery charger 24, battery control unit 54, etc.), in addition to or instead of control module 40, may be configured to perform one or more steps of the methodology. A charging system that is either part of or used with a plug-in electric vehicle, and a control unit thereof, in particular, may be configured to perform one or more steps of the methodology. In the case of plug-in electric vehicle 10, one or more components of the vehicle like battery charger 24, control module 40, and battery control unit 54, may include one or more component(s) (e.g., control unit) of a charging system, and as such, may be configured to perform one or more steps of the methodology. Therefore, the present methodology is not limited to performance by any one or more component. The terms "control module" and "control unit" are used interchangeably and may refer to the same component.

User interface 60 may include any combination of hardware, software and/or other components that enable a vehicle user to exchange information or data with the vehicle. This includes, for example, input components like a touch-screen display, a microphone, a keyboard, a keypad, one or more pushbuttons, a graphical user interface (GUI), or other suitable control where user interface 60 receives information from a vehicle user, as well as output components like a visual display, an instrument panel, or an audio system where user interface 60 provides information to the vehicle user. In some cases, user interface 60 includes components with both input and output capabilities, such as visual and audible interfaces. The audible interface may be part of an automated voice processing system that uses voice-recognition and/or other human-machine interface (HMI) technology. User interface 60 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port (wired or wireless) for connecting with a laptop or other computing or data entry device, to cite a few examples.

As explained below in more detail, user interface 60 may be used by the present method to exchange information between a vehicle user and the plug-in electric vehicle in a way that facilitates control of the charging process. For instance, user interface 60 may receive one or more customized charging settings, thresholds or criteria like utility rate preferences, vehicle conditions, charging times (e.g., desired charging start and/or completion times), an anticipated next departure time, and/or other input from a vehicle user; input that may be used by the present method to control the charging of the battery of the plug-in electric vehicle. In addition, user interface 60 may be used by the present method to provide charging status, reports and/or other output to a vehicle user. Other user interfaces may be used instead, as the exemplary user interfaces shown and described herein represent only some of the possibilities. The present method may utilize any user interface to exchange information between a vehicle user and the plug-in electric vehicle and is not limited to any particular type.

Communications module 70 may include any combination of hardware, software and/or other components that enable wireless voice and/or data communication between the vehicle and some other entity. According to one exemplary embodiment, communications module 70 includes a voice interface, a data interface and a GPS receiver 76, and may be bundled or integrated within a device such as a telematics unit. The voice interface enables voice communication to and/or from the plug-in electric vehicle and may include a cellular chipset (e.g., CDMA or GSM chipset), a vocoder, voice over IP (VOIP) equipment, and/or any other suitable device. The data interface, on the other hand, enables data communication to and/or from the plug-in electric vehicle and may include a modem (e.g., a modem using EVDO, CDMA, GPRS or EDGE technologies), a wireless networking component (e.g., one using an IEEE 802.11 protocol, WiMAX, BlueTooth, etc.), or any other suitable device. Depending on the particular embodiment, communications module 70 may communicate over a wireless carrier system (e.g., a cellular network), a wireless network (e.g., a wireless LAN, WAN, etc.), or some other wireless medium. GPS receiver 76 may receive signals from a constellation of GPS satellites and use these signals to determine vehicle position, as is well understood in the art.

The present method may use communications module 70 to exchange information between plug-in electric vehicle 10 and a vehicle user (e.g., via a call center, a website, a mobile communications device, etc.), a public utility and/or some other entity in a way that facilitates the charging process. For example, communications module 70 may be used to receive electricity rates from a local public utility, to receive electricity rate preferences from a user, etc. This includes remote vehicle users who enter customized charging settings or criteria via a website or mobile device and then send it to the plug-in electric vehicle. In one embodiment, communications module 70 acts as an alternative to user interface 60 for exchanging information between a vehicle user and the plug-in electric vehicle. In another embodiment, communications module 70 and user interface 60 are both used to exchange such information. Other embodiments and arrangements are also possible. The method described below is not limited to any particular communications module or technology, and it may be used with devices other than the exemplary communications module shown and described here.

Again, the preceding description of exemplary plug-in electric vehicle 10 and the drawing in FIG. 1 are only intended to illustrate one potential vehicle arrangement and to do so in a general way. Any number of other vehicle arrangements and architectures, including those that differ significantly from the one shown in FIG. 1, may be used instead.

Figure 2:
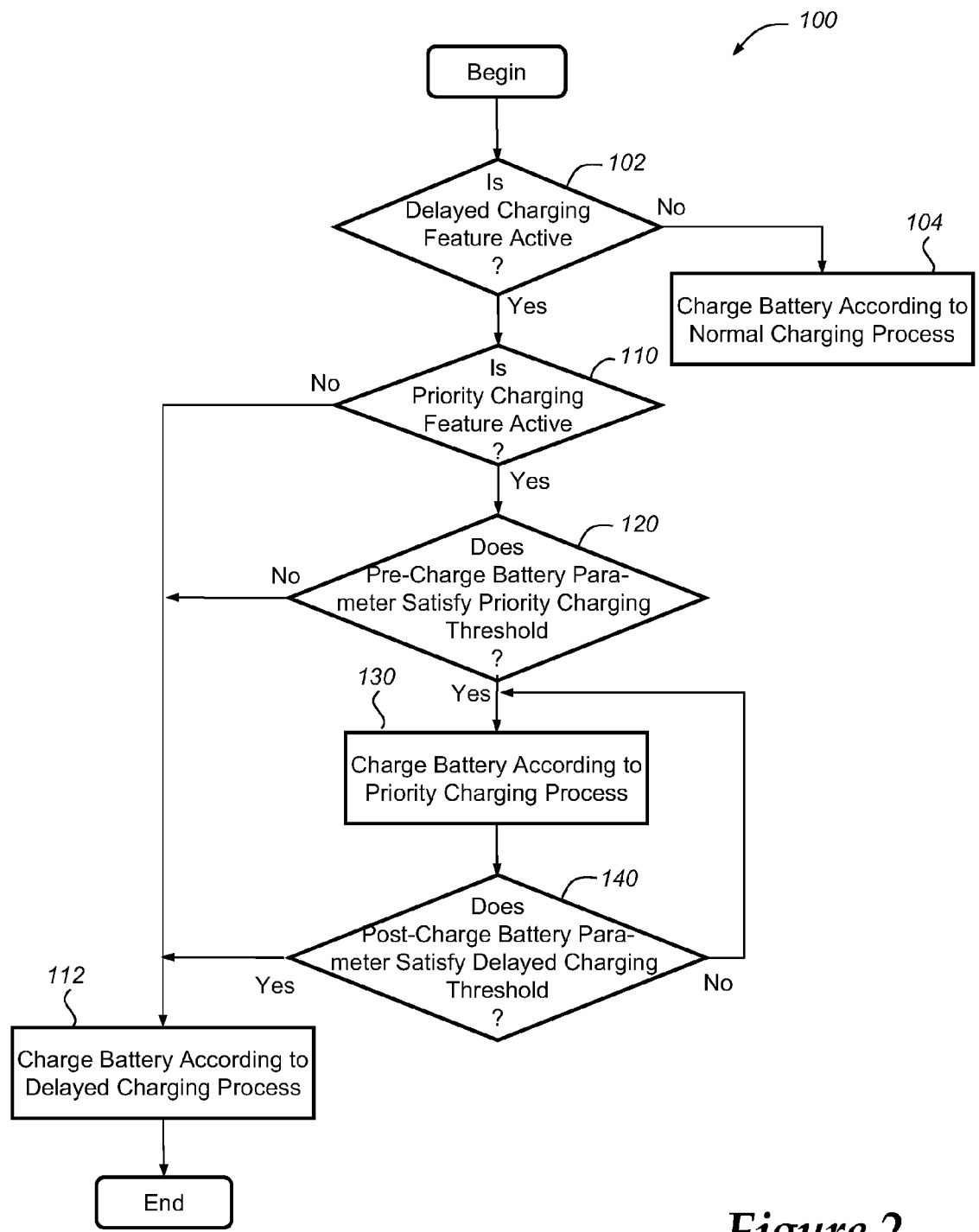
FIG. 2 is a flow chart of an exemplary method for charging a battery of a plug-in electric vehicle, such as that illustrated in FIG. 1.

Turning to FIG. 2, there is shown an exemplary method 100 for charging a battery of a plug-in electric vehicle, such as, battery 30 of plug-in electrical vehicle 10. Method 100 may use various readings, conditions, parameters, thresholds, information, comparisons, calculations, etc. to both evaluate the charge level or capacity of the battery and to control charging of the battery based on that evaluation. For example, the method may utilize values or readings for one or more battery parameters—some non-limiting examples of battery parameters include battery state-of-charge (SOC), battery voltage, battery current, etc.—in conjunction with thresholds or other data structures in order to determine whether the battery should be charged according to a priority charging process, a delayed charging process or some other process.

Method 100 is designed for use with a plug-in electric vehicle having a delayed charging feature that allows for charging the battery at some time after the vehicle has been plugged into an external power source. Delayed charging features can be based on a number of factors, including preferences provided by the vehicle user. For example, a delayed charging feature may postpone charging until some off-peak time when electricity rates are low, or it may delay charging so that completion of the charging process is timed to coincide with the next expected use of the vehicle, to cite two possibilities. The term "delayed charging feature," as used herein, includes any feature that causes a plug-in electric vehicle to put off, postpone and/or otherwise delay charging until some later time after the vehicle has been plugged into an external power source. When a plug-in electric vehicle includes a delayed charging feature, it may be desirable for the vehicle to also include a priority charging feature.

A priority charging feature is designed so that when a delayed charging feature is active, the priority charging feature may temporarily override the delayed charging feature and start charging the battery without delay. The "priority charging process," as it is referred to below, ensures that the plug-in electric vehicle, and more particularly the battery, has at least a minimal charge level or capacity in the event that an unplanned event occurs that necessitates use of the vehicle (e.g., a short trip) during the time in which charging would normally be delayed. The priority charging feature can provide the vehicle user with the peace of mind of knowing that although a delayed charging feature is active, the vehicle will still be available in the event of an unforeseen circumstance or occurrence that requires its use.

In an exemplary embodiment where a plug-in electric vehicle includes both delayed and priority charging features, method 100 may begin with step 102 which determines if a delayed charging feature is active. If the delayed charging feature is not active, the method can charge the battery as it normally would in the absence of such a feature (e.g., start charging the battery soon after connecting the plug-in electric vehicle to an external power source). In this type of situation where there is no scheduled delay in battery charging, the method proceeds to step 104 where the battery is charged according to a normal, default and/or other charging process. If, on the other hand, step 102 determines that a delayed charging feature is active, the method may proceed to step 110.

Step 110, which is an optional step, determines if a priority charging feature is active. One potential reason for this step being optional is because the plug-in electric vehicle could be configured such that a priority charging feature is a default setting, in which case the method may skip the inquiry in step 110 and proceed right to step 120. If step 110 determines that the priority charging feature is not active, then the method may simply proceed to step 112 so that the battery can be charged according to the delayed charging process (situation where the delayed charging feature is active and the priority charging feature is inactive). Conversely, if step 110 determines that a priority charging feature is also active or if the priority charging feature is the default setting, then the method continues to step 120 for further evaluation. According to one possible embodiment, the statuses of the delayed charging feature and the priority charging feature are maintained in electronic memory in plug-in electric vehicle 10 and are retrieved and determined by control module 40 or battery control unit 54. Other embodiments are certainly possible.

Step 120 then determines if one or more pre-charge battery parameter(s) satisfies a priority charging threshold. Generally speaking, the method only needs to implement the priority charging feature in situations where the battery is so depleted (i.e., situations where the pre-charge battery parameter satisfies the priority charging threshold) that it warrants temporarily overriding the delayed charging feature and immediately charging the battery to some minimum level. A "pre-charge battery parameter," as used herein, may include any condition, variable and/or other parameter that pertains to the vehicle battery and is obtained before a priority charging process has started charging the battery; this is usually around the time when the plug-in electric vehicle is initially connected to an external power source. Some examples of pre-charge battery parameters include, but are certainly not limited to, battery state-of-charge (SOC), battery voltage and battery current, to name a few. A "priority charging threshold," as used herein, may include any value, limit and/or other threshold that is utilized by the method to determine if a priority charging feature should be enabled. Some non-limiting examples of priority charging thresholds include SOC thresholds, voltage thresholds, current thresholds, etc. In one exemplary embodiment of step 120, control module 40 or battery control unit 54 receives an initial battery SOC reading (pre-charge battery parameter) from battery sensors 52 and compares it to an SOC threshold (priority charging threshold). If the initial SOC reading is less than the SOC threshold, then the priority charging threshold is satisfied, as this indicates that the priority charging feature should be enabled.

In certain instances, however, even though the priority charging feature is active, it may not be necessary to enable it. One such instance is when the pre-charge battery parameter does not satisfy the priority charging threshold; this indicates that there is already sufficient charge on the battery so that the need for the priority charging feature, as well as the benefits thereof, are negated. For example, if the initial state-of-charge (SOC) of the battery (pre-charge battery parameter) is greater than the corresponding SOC threshold (priority charging threshold), then a priority charging feature may not be needed since the battery already has a sufficient amount of charge to power the plug-in electric vehicle for short term use. Pre-charge battery parameters, as well as post-charge battery parameters which are described below, may be acquired or gathered in a variety of ways, including by: directly measuring the parameter with battery sensors 52, calculating or deriving the parameter with the use of other data, or by some other suitable technique. Of course, various types of filtering, averaging and/or other processing techniques may be used as well.

Generally speaking, a priority charging threshold is "satisfied" when the comparison between the pre-charge battery parameter and the priority charging threshold indicates that a priority charging feature should be enabled or is otherwise appropriate. Skilled artisans will appreciate that pre-charge battery parameters, priority charging thresholds, and comparisons other than those examples mentioned above may be used instead. In one embodiment, step 120 compares multiple pre-charge battery parameters to multiple priority charging thresholds in order to determine if a priority charging feature is needed. If step 120 determines that the pre-charge battery parameter does not satisfy the priority charging threshold (i.e., a priority charging feature should not be enabled), then the method proceeds to step 112 so that the battery can be charged according to a delayed charging process, as already explained. If, on the other hand, step 120 decides that the pre-charge battery parameter does in fact satisfy the priority charging threshold, then the method continues on to step 130.

Step 130 charges the battery according to a priority charging process, and may be carried out in a number of different ways. The priority charging feature, once enabled, may temporarily interrupt, suspend, preempt and/or override operation of a delayed charging feature so that a priority charging process can begin charging the battery soon after the plug-in electric vehicle is connected to an external power source. Skilled artisans will appreciate that "soon after" or "without delay" may not be the exact instant or moment that the plug-in vehicle is connected to an external power source, as there are usually a number of start-up, hand-shaking and/or other initial processes that need to be performed before charging can begin. This is different, however, than a delayed charging process which purposely delays or postpones the charging process until a later and more preferable time. Priority charging typically begins within seconds or several minutes of when the plug-in electric vehicle is plugged in, while delayed charging usually begins within many minutes or hours of when the vehicle is plugged in; the aforementioned time limits are only meant to illustrate the general premise, and are certainly not meant to limit the present method. In one potential scenario, control module 40 or battery control unit 54 executes instructions for a priority charging process that cause it to send charging or command signals to battery charger 24, which in turn cause it to charge battery 30 soon thereafter.

The priority charging process may continue until it is no longer needed, at which point the priority charging process stops and the delayed charging process begins. One way for this to occur is for step 140 to determine if one or more post-charge battery parameter(s) satisfy a delayed charging threshold. A "post-charge battery parameter," as used herein, may include any condition, variable and/or other parameter that pertains to the vehicle battery and is obtained after a priority charging process has started charging the battery. Much like the priority evaluation described above, step 140 takes readings for a post-charge battery parameter and compares it to a delayed charging threshold. A "delayed charging threshold," as used herein, may include any value, limit and/or other threshold that is utilized by the method to determine if a delayed charging feature should be enabled. The post-charge battery parameter(s) may be obtained and monitored throughout the priority charging process in order to determine when the delayed charging threshold is satisfied, and therefore, when the priority charging process can be terminated. In an exemplary embodiment, battery sensor(s) 52 provide periodic readings for the post-charge battery parameter(s) to control module 40 or battery control unit 54 so that the method can monitor such parameter(s) and determine when it is appropriate for the priority charging to end and the delayed charging to begin. So long as the delayed charging threshold is not satisfied, the method may continue looping steps 130 and 140 for continued priority charging and monitoring. Once the delayed charging threshold is satisfied, the method may proceed to step 112 to charge the battery according to a delayed charging process, as addressed above and explained below in more detail.

Step 112 may be performed according to any number of different delayed charging processes, and method 100 is not limited to any particular one. In some embodiments, step 112 simply performs or executes an already developed delayed charging process; in other embodiments, step 112 first develops the delayed charging process using the settings from the priority charging process, and then performs or executes it. Those skilled in the art will appreciate that various criteria, input, factors, etc. may be used to develop the details for a delayed charging process, including deciding the duration of the delay period or the subsequent charging period, when each period will begin and end, the charging parameters, etc. Some examples of suitable criteria used to develop delayed charging schemes include desired charging start/completion times, anticipated next departure time, electricity rate preferences, and more. This criteria is oftentimes provided by the user. Once the delayed charging process is established, various details of it may be communicated to the user via user interface 60 or communications module 70 so that the user knows when charging will begin and end.

As mentioned above, it is possible for step 112 to utilize information from a priority charging process in order to develop or establish a delayed charging process. For instance, if the method knows that at the end of a priority charging process the battery will have a state-of-charge (SOC) that is approximately 30%, this information may be useful in developing the operational parameters or particulars of the delayed charging process. In any event, step 112 may develop or establish the delayed charging process, with or without information from the priority charging process, at any point prior to the method actually executing such process. This includes developing or establishing the delayed charging process during any combination of the steps shown in FIG. 2. It is also possible for method 100 to revise or make adjustments to an already established delayed charging process in light of information from the priority charging process. In such an embodiment, the method uses information from the priority charging process to adjust or otherwise manipulate one or more parameters or characteristics of the delayed charging process. Other embodiments are certainly possible.

Figure 3:
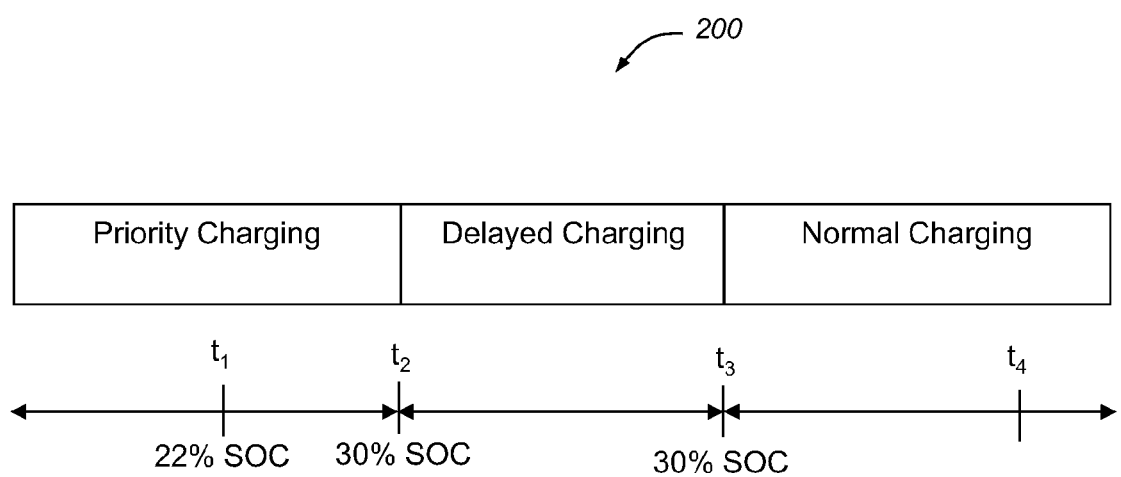
FIG. 3 is a diagram illustrating an exemplary application of the methodology depicted in FIG. 2.

Referring now to the diagram 200 in FIG. 3, there is shown an exemplary embodiment where the pre-charge battery parameter and the post-charge battery parameter used in steps 120 and 140, respectively, are both a battery state-of-charge (SOC). For purposes of this example, assume that: both the delayed charging feature and the priority charging feature are active, the battery SOC when plug-in electric vehicle 10 is initially connected to external power source 12 is 22% (pre-charge battery parameter), the priority charging threshold is an SOC threshold of 30%, and the delayed charging threshold is also an SOC threshold of 30% (it may be useful to provide a delayed charging threshold that is slightly above the priority charging threshold for purposes of hysteresis). After a user connects plug-in vehicle 10 to external power source 12 for charging (time $t_1$), steps 102 and 110 would respectively determine that the delayed and priority charging features are active, and step 120 would determine that the pre-charge battery parameter satisfies the priority charging threshold (battery SOC of 22% is less than SOC threshold of 30%). As explained above, the priority charging threshold is satisfied because vehicle battery 30 is at a depleted level where a priority charging feature should be enabled. Soon after, step 130 begins charging the battery according to a priority charging process, instead of waiting and charging it later according to a delayed charging process. Charging the battery at step 130 increases the battery SOC until the post-charge battery parameter satisfies the delayed charging threshold (time $t_2$), which is an SOC threshold of 30% in this example. At this point, step 140 concludes that the priority charging process is no longer needed, so it initiates the delayed charging process at step 112, which postpones charging until a more optimal or desirable time (time $t_3$), for example, when the electricity rates are lower or when it is closer to the next time the user is expected to drive the vehicle. When the delayed charging process determines that it is time to resume charging (time $t_3$), normal charging of the plug-in electric vehicle battery commences and continues until the battery is fully charged (time $t_4$).

The preceding example is merely exemplary and is not meant to be limiting in nature. For instance, there are a number of different battery parameter embodiments that may be used by the method. In one example, pre-charge and post-charge battery parameters other than battery state-of-charge (SOC) are used, such as battery voltage or a battery current. In the case of battery voltage, steps 120 and/or 140 may compare a battery voltage to a corresponding voltage threshold; in the case of battery current, step 140 may compare the amount of current that has flowed into the battery during the priority charging process to a corresponding current threshold (e.g., the amount of Amp-Hours). In the exemplary method of FIG. 2, the pre-charge and post-charge battery parameters used in steps 120 and 140 include the same parameter or combination of parameters (i.e., they both use a battery SOC). In another example, however, the pre-charge and post-charge battery parameters used in steps 120 and 140 include a different parameter or combination of parameters (e.g., step 120 may use a battery SOC and step 140 may use a battery voltage or a battery SOC and a battery voltage). Other potential embodiments or implementations of battery parameters are certainly possible.

It is also possible for the present method to utilize different threshold embodiments. For example, some thresholds may be satisfied when the parameter to which they are being compared is less than and/or equal to the threshold (e.g., the priority charging threshold in step 120), while other thresholds may be satisfied when the parameter to which they are being compared is greater than and/or equal to the threshold (e.g., the delayed charging threshold in step 140). According to another example, the priority and/or delayed charging threshold may be a non-adjustable value that is set as part of the design or manufacturing process (i.e., the value may be programmed into electronic memory prior to delivery of the vehicle to the customer). Alternatively, the priority and/or delayed charging threshold may be a user-defined or user-selected value where a user provides the system with a desired value or selection via user interface 60 and/or communications module 70, for example. Such an embodiment may require method 100 to include an additional step (not shown) where the method receives a user-defined or user-selected threshold value, and establishes the priority and/or delayed charging threshold with such a value at some time prior to performing step 120 and/or step 140. It is also possible for the priority and/or delayed charging threshold to be modified during the priority charging process, for example, instead of being static all throughout that process. In yet another example, instead of simply comparing the various battery parameters to a single threshold value, they may be compared to a threshold value that is maintained in a data structure (e.g., a look-up table) and is dependent on more or variables (e.g., delayed charging threshold dependent on initial or pre-charge SOC reading). Accordingly, it will be appreciated that any number of evaluation techniques may be used to evaluate the acquired parameter value and to determine, based on that evaluation, whether or not the priority charging feature should be enabled, and that each such technique remains within the spirit and scope of the present disclosure.

Method 100 may also have one or more intervening steps that are interjected and performed at an appropriate place. For instance, a user may selectively activate or deactivate the priority charging feature and/or the delayed charging feature using user interface 60, communications module 70 or some other device.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, one or more of the steps in method 100 may not be performed or may not be applicable, or may be performed in a different sequence than that or those described above. The order of steps 102, 110 and/or 120 could be changed or, for example, some of those steps could be omitted. Therefore, it will be appreciated that embodiments of method 100 comprising less than all of the steps described above, and/or different sequences of the steps thereof, remain within the spirit and scope of the present disclosure. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of charging a battery in a plug-in electric vehicle, comprising the steps of:
    (a) determining if a delayed charging feature is active;
    (b) determining if a pre-charge battery parameter satisfies a priority charging threshold; and
    (c) when the delayed charging feature is active and the pre-charge battery parameter satisfies the priority charging threshold, then using a control module to enable a priority charging feature that temporarily overrides the delayed charging feature and charges the battery according to a priority charging process.

2. The method of claim 1, wherein the pre-charge battery parameter is received from a battery sensor and includes at least one parameter selected from the group consisting of: a battery state-of-charge (SOC) or a battery voltage.

3. The method of claim 1, wherein step (b) further comprises determining if a priority charging feature is active, and step (c) further comprises when both the delayed charging feature and the priority charging feature are active and the pre-charge battery parameter satisfies the priority charging threshold, then using a control module to enable the priority charging feature.

4. The method of claim 1, further comprising the step of:
    (d) determining if a post-charge battery parameter satisfies a delayed charging threshold, and charging the battery according to the priority charging process until the post-charge battery parameter satisfies the delayed charging threshold.

5. The method of claim 4, wherein the pre-charge battery parameter includes the same parameter or combination of parameters as the post-charge battery parameter.

6. The method of claim 4, wherein the pre-charge battery parameter includes a different parameter or combination of parameters than the post-charge battery parameter.

7. The method of claim 4, wherein the post-charge battery parameter is received from a battery sensor and includes at least one parameter selected from the group consisting of: a battery state-of-charge (SOC), a battery voltage, or a battery current.

8. The method of claim 4, wherein at least one of the priority charging threshold or the delayed charging threshold includes a user-defined or a user-selected value provided by a user.

9. The method of claim 4, wherein step (b) further comprises determining if the pre-charge battery parameter satisfies the priority charging threshold by determining if a battery state-of-charge (SOC) reading is less than an SOC threshold value, and step (d) further comprises determining if the post-charge battery parameter satisfies the delayed charging threshold by determining if a battery state-of-charge (SOC) reading is greater than or equal to an SOC threshold value.

10. The method of claim 4, wherein step (d) further comprises:
(i) receiving readings for the post-charge battery parameter, the readings are received at a control module from one or more battery sensors;
(ii) comparing the readings for the post-charge battery parameter to the delayed charging threshold, the comparison is performed at the control module; and
(iii) so long as the readings for the post-charge battery parameter do not satisfy the delayed charging threshold, then providing command signals for continuing to charge the battery according to the priority charging process, the command signals are provided to a battery charger from the control module.

11. The method of claim 1, further comprising the step of:
(d) using information from the priority charging process to develop or modify a delayed charging process, and when the post-charge battery parameter satisfies the delayed charging threshold, then charging the battery according to the delayed charging process.

12. A method of charging a battery in a plug-in electric vehicle, comprising the steps of:
(a) determining if the battery is connected to an external power source;
(b) determining if the battery is severely depleted;
(c) when the battery is connected to the external power source and the battery is severely depleted, then using a control module to bypass a delayed charging process and to charge the battery according to a priority charging process; and
(d) when the battery is still connected to the external power source and the battery is no longer severely depleted, then using the control module to stop the priority charging process and to begin the delayed charging process.

13. The method of claim 12, wherein step (b) further comprises determining if the battery is severely depleted by determining if a pre-charge battery parameter satisfies a priority charging threshold.

14. The method of claim 13, wherein the pre-charge battery parameter is received from a battery sensor and includes at least one parameter selected from the group consisting of: a battery state-of-charge (SOC) or a battery voltage.

15. The method of claim 12, wherein step (d) further comprises determining when the battery is no longer severely depleted by determining if a post-charge battery parameter satisfies a delayed charging threshold.

16. The method of claim 15, wherein the post-charge battery parameter is received from a battery sensor and includes at least one parameter selected from the group consisting of: a battery state-of-charge (SOC), a battery voltage, or a battery current.

17. The method of claim 15, wherein step (d) further comprises:
(i) receiving readings for the post-charge battery parameter, the readings are received at a control module from one or more battery sensors;
(ii) comparing the readings for the post-charge battery parameter to the delayed charging threshold, the comparison is performed at the control module; and
(iii) so long as the readings for the post-charge battery parameter do not satisfy the delayed charging threshold, then providing command signals for continuing to charge the battery according to the priority charging process, the command signals are provided to a battery charger from the control module.

18. The method of claim 12, wherein step (d) further comprises using information from the priority charging process to develop or modify the delayed charging process.

19. A system for charging a battery in a plug-in electric vehicle, comprising:
one or more battery sensor(s) coupled to the battery, the battery sensor(s) provide battery parameters;
a control module coupled to the battery sensor(s) for receiving the battery parameters, the control module is configured to:
determine if a delayed charging feature is active;
determine if the battery parameters satisfy a priority charging threshold; and
provide command signals when the delayed charging feature is active and the battery parameters satisfy the priority charging threshold; and
a battery charger coupled to the control module for receiving the command signals, wherein the command signals cause the battery charger to charge the battery according to a priority charging process.

* * * * *